(12) United States Patent
Abdolvand et al.

(10) Patent No.: US 12,399,313 B2
(45) Date of Patent: Aug. 26, 2025

(54) HOLLOW-CORE FIBER BASED BROADBAND RADIATION GENERATOR WITH EXTENDED FIBER LIFETIME

(71) Applicant: ASML NETHERLANDS B.V., Veldhoven (NL)

(72) Inventors: Amir Abdolvand, Eindhoven (NL); Cristian Bogdan Craus, Helmond (NL); Anna Ezerskaia, Luyksgestel (NL); Phani Kumar Domalapally, Best (NL)

(73) Assignee: ASML NETHERLANDS, Veldhoven (NL)

(*) Notice: Subject to any disclaimer, the term of this patent is extended or adjusted under 35 U.S.C. 154(b) by 0 days.

(21) Appl. No.: 18/213,085

(22) Filed: Jun. 22, 2023

(65) Prior Publication Data
US 2023/0333314 A1    Oct. 19, 2023

Related U.S. Application Data

(63) Continuation of application No. 17/361,449, filed on Jun. 29, 2021, now abandoned.

(30) Foreign Application Priority Data

| Jul. 8, 2020 | (EP) | 20184730 |
| Apr. 13, 2021 | (EP) | 21167961 |

(51) Int. Cl.
*G02B 6/02* (2006.01)
*G02B 6/032* (2006.01)
(Continued)

(52) U.S. Cl.
CPC ......... *G02B 6/02304* (2013.01); *G02B 6/032* (2013.01); *G02F 1/3528* (2021.01);
(Continued)

(58) Field of Classification Search
CPC ............... G02B 6/02304; G02B 6/032; G02B 2006/0325; G02F 1/3528; G02F 1/355; G02F 1/383
See application file for complete search history.

(56) References Cited

U.S. PATENT DOCUMENTS

| 6,952,253 B2 | 10/2005 | Lof et al. |
| 6,961,116 B2 | 11/2005 | Den Boef et al. |
| (Continued) | | |

FOREIGN PATENT DOCUMENTS

| EP | 1628164 | 2/2006 |
| EP | 3136143 | 3/2017 |
| (Continued) | | |

OTHER PUBLICATIONS

Office Action issued in corresponding Korean Patent Application No. 10-2023-7000534, dated Jun. 20, 2024.
(Continued)

*Primary Examiner* — Jerry Rahll
(74) *Attorney, Agent, or Firm* — Pillsbury Winthrop Shaw Pittman, LLP

(57) ABSTRACT

An optical component for a broadband radiation source device, the optical component configured for generating a broadband output upon receiving pump radiation and including: a hollow-core photonic crystal fiber (HC-PCF); and a gas mixture filling the HC-PCF, wherein the gas mixture includes a mixture of at least one first gas configured for the generation of the broadband radiation and at least one second gas including or consisting of helium.

20 Claims, 6 Drawing Sheets

(51) Int. Cl.
*G02F 1/35* (2006.01)
*G02F 1/355* (2006.01)
*G02F 1/383* (2006.01)

(52) U.S. Cl.
CPC .............. *G02F 1/355* (2013.01); *G02F 1/383* (2013.01); *G02B 2006/0325* (2013.01)

(56) References Cited

U.S. PATENT DOCUMENTS

| | | |
|---|---|---|
| 7,265,364 B2 | 9/2007 | Teunissen et al. |
| 7,646,471 B2 | 1/2010 | Teunissen et al. |
| 7,652,430 B1 | 1/2010 | Delgado |
| 9,160,137 B1 * | 10/2015 | Abdolvand ........... H01S 3/0092 |
| 9,948,055 B2 | 4/2018 | Chen et al. |
| 10,693,271 B2 | 6/2020 | Uebel et al. |
| 2004/0175085 A1 | 9/2004 | Forbes et al. |
| 2005/0259942 A1 | 11/2005 | Rudolph et al. |
| 2006/0221314 A1 | 10/2006 | Wilhelmus Jacobs et al. |
| 2007/0296960 A1 | 12/2007 | Den Boef et al. |
| 2008/0094636 A1 | 4/2008 | Jin et al. |
| 2008/0198380 A1 | 8/2008 | Straaijer et al. |
| 2008/0277810 A1 | 11/2008 | Sato et al. |
| 2009/0168062 A1 | 7/2009 | Straaijer |
| 2010/0007863 A1 | 1/2010 | Jordanoska |
| 2010/0233600 A1 | 9/2010 | Den Boef et al. |
| 2010/0303429 A1 | 12/2010 | Gibson et al. |
| 2010/0328655 A1 | 12/2010 | Den Boef |
| 2011/0026032 A1 | 2/2011 | Den Boef et al. |
| 2011/0032500 A1 | 2/2011 | Straaijer |
| 2011/0102753 A1 | 5/2011 | Van De Kerkhof et al. |
| 2011/0102793 A1 | 5/2011 | Straaijer |
| 2011/0249244 A1 | 10/2011 | Leewis et al. |
| 2012/0044470 A1 | 2/2012 | Smilde et al. |
| 2012/0044495 A1 | 2/2012 | Straaijer |
| 2013/0162996 A1 | 6/2013 | Straaijer et al. |
| 2013/0202006 A1 | 8/2013 | Rudolph et al. |
| 2013/0308142 A1 | 11/2013 | Straaijer |
| 2015/0261097 A1 | 9/2015 | Mathijssen et al. |
| 2016/0161863 A1 | 6/2016 | Den Boef et al. |
| 2016/0370717 A1 | 12/2016 | Den Boef et al. |
| 2019/0319420 A1 | 10/2019 | Uebel et al. |

FOREIGN PATENT DOCUMENTS

| | | |
|---|---|---|
| EP | 3647874 | 5/2020 |
| JP | H02282205 | 11/1990 |
| JP | H11354862 | 12/1999 |
| JP | 2000329952 | 11/2000 |
| JP | 2007532955 | 11/2007 |
| JP | 2007533374 | 11/2007 |
| JP | 2009513995 | 4/2009 |
| JP | 3181659 | 2/2013 |
| JP | 2018533042 | 11/2018 |
| JP | 2020514785 | 5/2020 |
| KR | 2019-0100404 | 8/2019 |
| TW | 200527018 | 8/2005 |
| WO | 2016102127 | 6/2016 |
| WO | 2018127266 | 7/2018 |
| WO | 2020083624 | 4/2020 |

OTHER PUBLICATIONS

Taiwanese Office Action issued in corresponding Taiwanese Patent Application No. 110124727, dated Mar. 23, 2022.

Office Action issued in corresponding Chinese Patent Application No. 202180048010.0, dated Apr. 8, 2025.

* cited by examiner

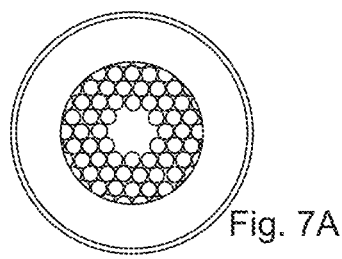 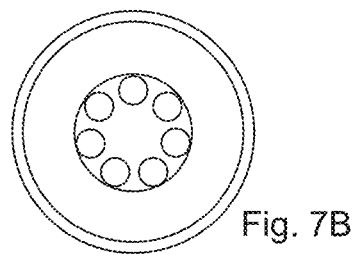
Fig. 7A　　　　　　　　Fig. 7B
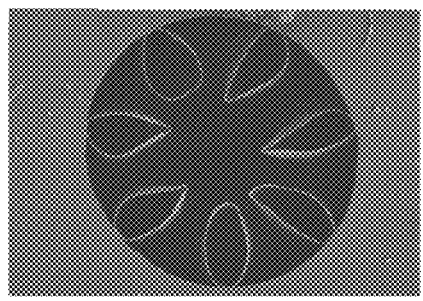 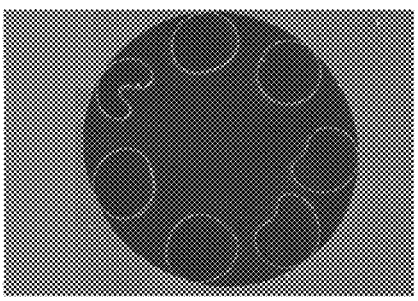
Fig. 8A　　　　　　　　Fig. 8B
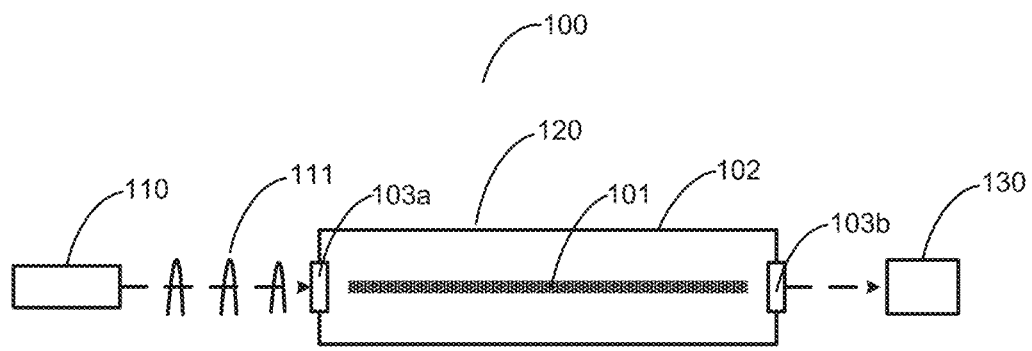
Fig. 9

HOLLOW-CORE FIBER BASED BROADBAND RADIATION GENERATOR WITH EXTENDED FIBER LIFETIME

This application is a continuation of co-pending U.S. patent application Ser. No. 17/361,449, filed Jun. 29, 2021, which claims priority to European patent application no. 20184730.8, filed Jul. 8, 2020 and to European patent application no. 21167961.8, filed Apr. 13, 2021, each of the foregoing applications is incorporated herein in its entirety by reference.

FIELD

The present description relates to a hollow-core fiber based broadband radiation generator, and in particular such a broadband radiation generator in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

SUMMARY

Metrology tools are used in many aspects of a device (e.g., IC) manufacturing process, for example as alignment tools for proper positioning of a substrate prior to an exposure, leveling tools to measure a surface topology of the substrate, for e.g., focus control and scatterometry based tools for inspecting/measuring the exposed and/or etched product in process control. In each case, a radiation source is used. For various reasons, including measurement robustness and accuracy, broadband or white light radiation sources are increasingly used for such metrology applications. It would be desirable to improve on present devices for broadband radiation generation.

In an aspect, there is provided an optical component for a broadband radiation source device, the optical component being configured for generating broadband radiation upon receiving pump radiation and comprising: a hollow-core photonic crystal fiber (HC-PCF); and a gas mixture filling the HC-PCF, wherein the gas mixture comprises a mixture of at least one first gas configured for the generation of the broadband radiation and at least one second gas comprising or consisting of helium for thermal conditioning of and/or dampening of acoustic waves within the gas mixture.

In an aspect, there is provided a broadband radiation source device comprising an optical component as described herein and further comprising a pump radiation source for generating the pump radiation.

In an aspect, there is provided a metrology tool for inspection of substrates, the metrology tool comprising a broadband radiation source device as described herein.

In an aspect, there is provided a method for configuring an optical component for a source arrangement configured for generating a broadband radiation output, the method comprising: selecting a hollow-core photonic crystal fiber (HC-PCF) and a gas mixture filling the HC-PCF comprising a first gas for generating the broadband radiation and a second gas comprising helium; and determining an optimized mole fraction of helium to be present within the gas mixture, wherein the optimized mole fraction of helium is based on one or more selected from: improving thermal conductivity of the gas mixture; improving thermal diffusivity of the gas mixture; or selecting a desired heat transfer mechanism.

BRIEF DESCRIPTION OF THE DRAWINGS

Embodiments of the invention will now be described, by way of example only, with reference to the accompanying schematic drawings, in which:

FIGS. 7A and 7B schematically depict transverse cross-sections of HC-PCF designs for broadband generation, including a Kagome design in FIG. 7A and a single-ring design in FIG. 7B;

FIGS. 8A and 8B show two cross-section images taken at two different locations of a HC-PCF with a single-ring design operated in a pure krypton gas, wherein FIG. 8A shows a cross-section image taken at the fiber end, and FIG. 8B shows a cross-section image taken at a location a few centimeters away from the same fiber end;

FIG. 9 schematically depicts a gas filled HC-PCF based broadband radiation source device;

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
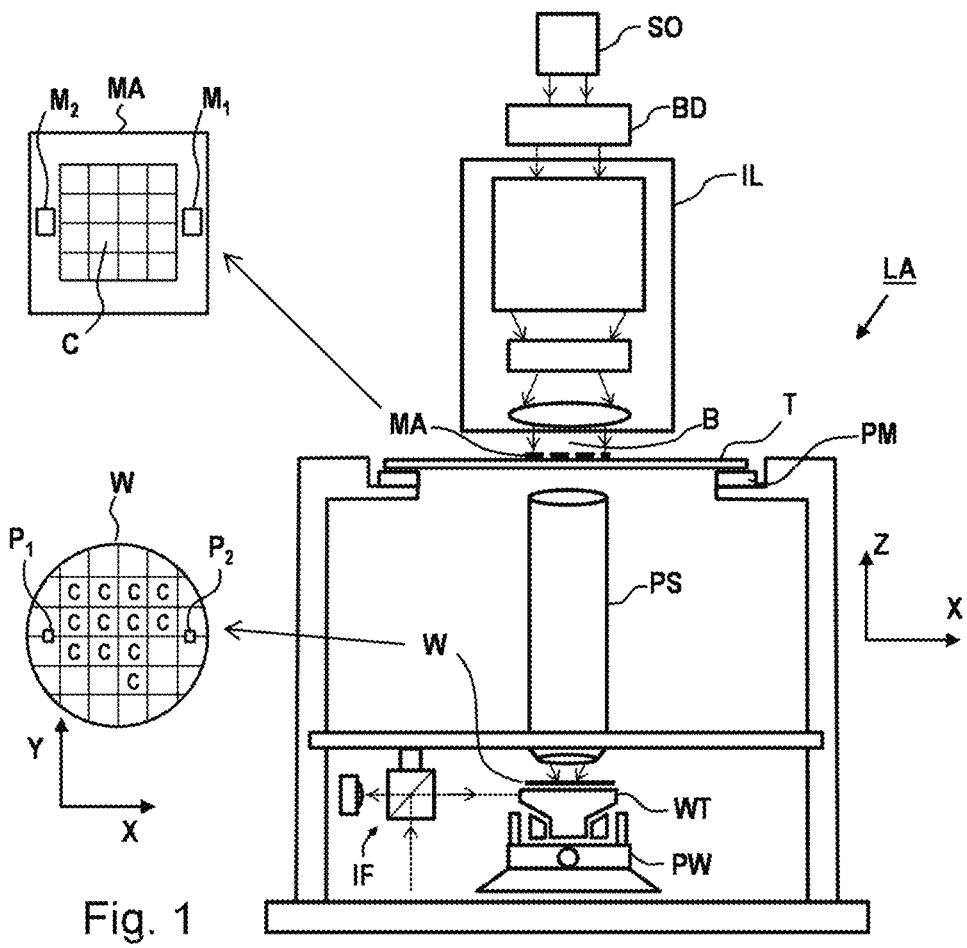
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a patterning device support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the patterning device MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using patterning device alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
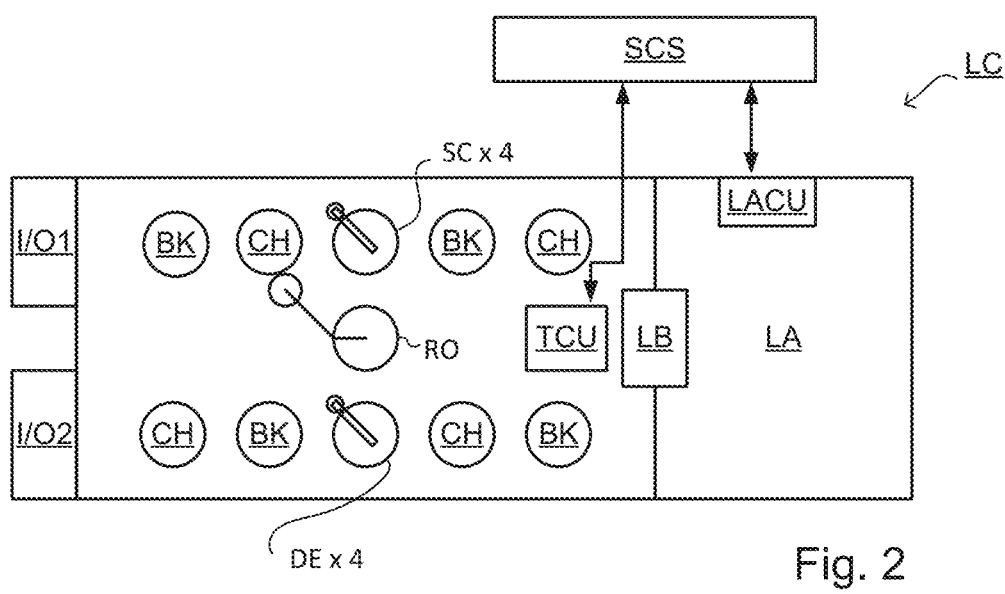
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
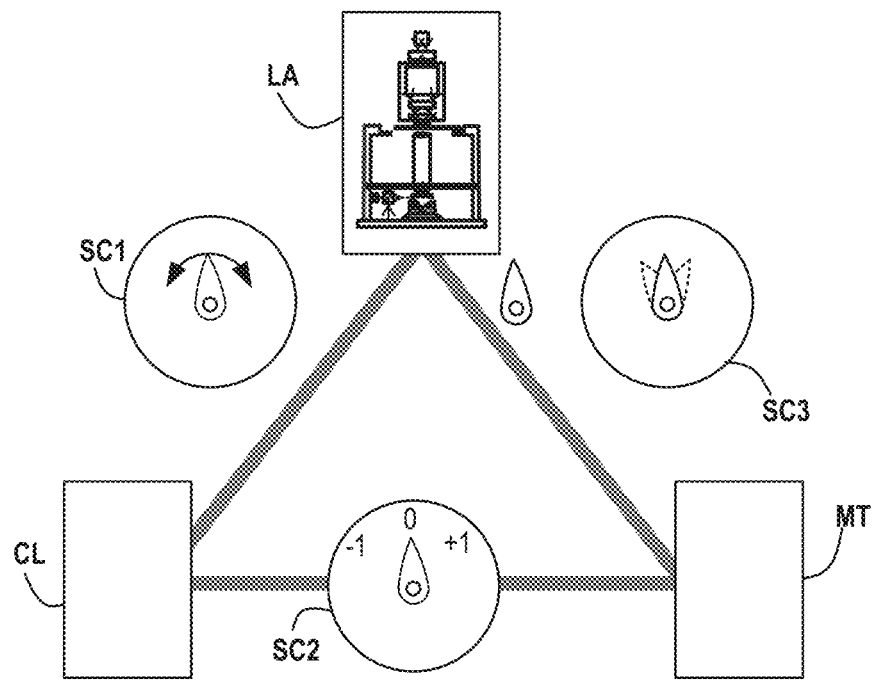
FIG. 3 depicts a schematic representation of holistic lithography, representing a cooperation between three technologies to optimize semiconductor manufacturing.

Typically the patterning process in a lithographic apparatus LA is one of the most critical steps in the processing which involves high accuracy of dimensioning and placement of structures on the substrate W. To help ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). An aspect of such a "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the one or more process parameters in the lithographic process or patterning process are allowed to vary.

The computer system CL may use (part of) the design layout to be patterned to predict which resolution enhancement techniques to use and to perform computational lithography simulations and calculations to determine which patterning device layout and lithographic apparatus settings help achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequent measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in U.S. patent application publication nos. US20100328655, US2011102753A1, US20120044470A, US20110249244, US20110026032 and European patent application publication no EP1,628,164A, each of the foregoing is incorporated herein in its entirety by reference. Aforementioned metrology tools may measure gratings using radiation from soft x-ray and visible to near-IR wavelength range.

In a first embodiment, the metrology tool MT is an angular resolved scatterometer. In such a scatterometer reconstruction methods may be applied to the measured signal to reconstruct or calculate one or more properties of the grating. Such reconstruction may, for example, result from simulating interaction of scattered radiation with a mathematical model of the target structure and comparing the simulation results with those of a measurement. One or more parameters of the mathematical model are adjusted until the simulated interaction produces a diffraction pattern similar to that observed from the real target.

In a second embodiment, the metrology tool MT is a spectroscopic scatterometer MT. In such a spectroscopic scatterometer, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the metrology tool MT is an ellipsometric scatterometer. The ellipsometric scatterometer allows for determining one or more parameters of a lithographic process by measuring scattered radiation for each polarization state. Such a metrology apparatus emits polarized radiation (such as linear, circular, or elliptic) by using, for example, appropriate one or more polarization filters in the illumination section of the metrology apparatus. A source suitable for the metrology apparatus may provide polarized radiation as well. Various embodiments of existing ellipsometric scatterometers are described in U.S. patent application publication nos. 2007-0296960, 2008-0198380, 2009-0168062, 2010-0007863, 2011-0032500, 2011-0102793, 2011-0188020, 2012-0044495, 2013-0162996 and 2013-0308142, each of which is incorporated herein in its entirety by reference.

Figure 4:
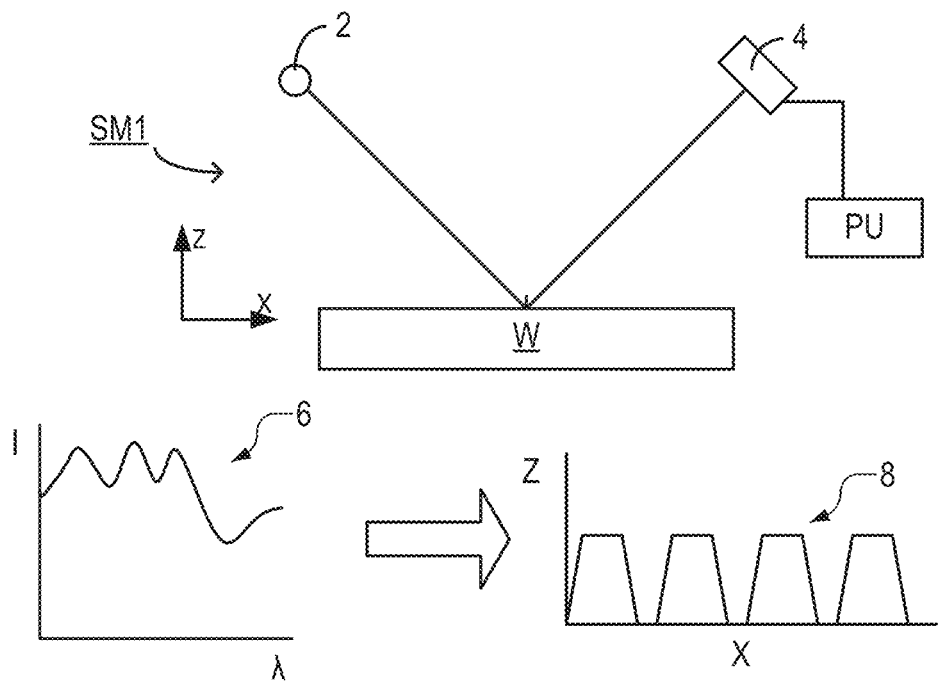
FIG. 4 depicts a schematic overview of a scatterometry apparatus used as a metrology device, which may comprise a radiation source according to embodiments of the invention.

A metrology apparatus, such as a scatterometer, is depicted in FIG. 4. It comprises a broadband (e.g., white light) radiation projector 2 which projects radiation onto a substrate W. The reflected or scattered radiation is passed to a spectrometer detector 4, which measures a spectrum 6 (i.e. a measurement of intensity as a function of wavelength) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and one or more parameters are assumed from knowledge of the process by which the structure was made, leaving only one or more parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application nos. US2016/0161863 and US 2016/0370717, each of which is incorporated herein in its entirety by reference.

Another type of metrology tool used in device manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
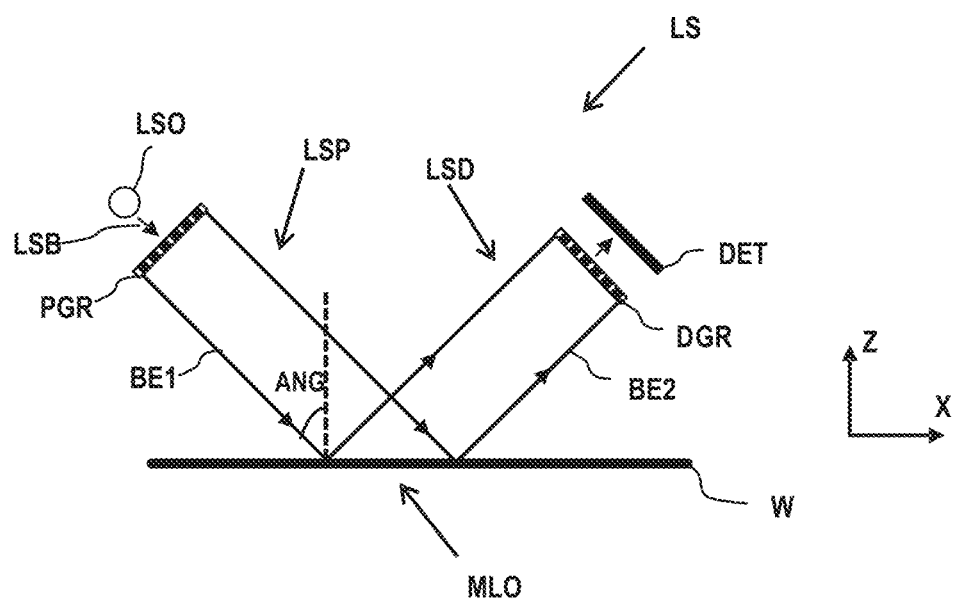
FIG. 5 depicts a schematic overview of a level sensor apparatus which may comprise a radiation source according to embodiments of the invention.

An example of a level or height sensor LS is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum radiation source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the radiation received, for example indicative of the intensity of the radiation received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include one or more further optical elements, such as one or more lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both of which are incorporated herein in their entireties by reference. A height sensor using UV radiation instead of visible or infrared radiation is disclosed in U.S. patent application publication no. US2010233600, which is incorporated herein in its entirety by reference. In PCT patent application publication no. WO2016102127, which is incorporated herein in its entirety by reference, a compact height sensor is described which uses a multi-element detector to detect and recognize the position of a grating image, without needing a detection grating.

Another type of metrology tool used in device manufacture is an alignment sensor. A significant aspect of performance of the lithographic apparatus is the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor is based on a self-referencing interferometer as described in U.S. Pat. No. 6,961,116, which is incorporated herein in its entirety by reference. Various enhancements and modifications of the position sensor have been developed, for example as disclosed in U.S. patent application publication no. US2015261097, which is incorporated herein in its entirety by reference.

Figure 6:
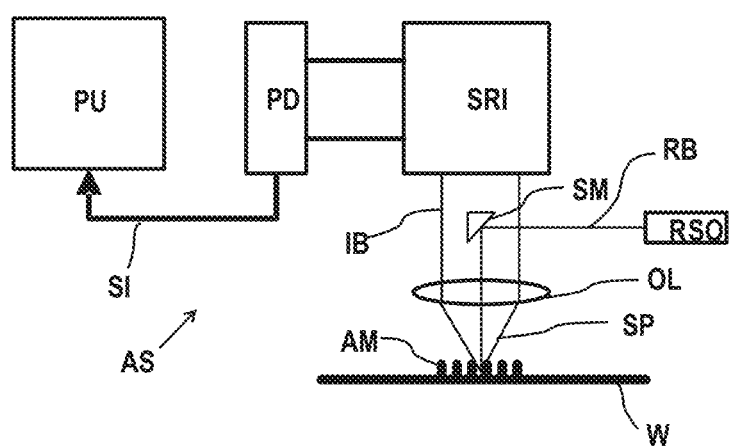
FIG. 6 depicts a schematic overview of an alignment sensor apparatus which may comprise a radiation source according to embodiments of the invention.

FIG. 6 is a schematic block diagram of an embodiment of an alignment sensor AS, comparable to one described, for example, in U.S. Pat. No. 6,961,116, which is incorporated herein in its entirety by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

For optical semiconductor metrology, inspection applications, such as in any of the aforementioned metrology tools, a bright radiation source which outputs coherent radiation, simultaneously covering a broad wavelength range (e.g., from UV to IR), is often preferred. Such a broadband radiation source can help improve the flexibility and robustness of applications by allowing substrates with different material characteristics to be optically examined in the same setup/system without a need for any hardware change (e.g., changing a radiation source so as to have a specific wavelength). Allowing the wavelength to be optimized for a specific application also means that the accuracy of measurements can be further increased.

Gas lasers, which are based on the gas-discharge effect to simultaneously emit multiple wavelengths, can be used in these applications. However, intrinsic issues such as high intensity instability and low spatial incoherence associated with gas lasers can make them unsuitable. Alternatively, outputs from multiple lasers (e.g., solid-state lasers) with different wavelengths can be spatially combined into the optical path of a metrology or inspection system so as to provide a multiple wavelength source. The complexity and high implementation costs, which increases with the number of wavelengths desired, prevents such a solution from being widely used. In contrast, a fiber-based broadband or white light laser, also called a supercontinuum laser, is able to emit radiation with high spatial coherence and broad spectral coverage, e.g., from UV to IR, and therefore is a very attractive and practical option.

A hollow-core photonic crystal fiber (HC-PCF) is a special type of optical fiber that comprises a central hollow core region and an inner cladding structure surrounding the hollow core, both of which extend axially along the entire fiber. The radiation guidance mechanism is enabled by the inner cladding waveguide structure, which may comprise, for example, thin-walled glass elements. The radiation is thus confined predominantly inside a hollow core and propagates along the fiber in the form of transverse core modes.

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs).

HC-PCFs comprise hollow channels which are filled with a fluid, such that they possess resultant desired characteristics for various radiation guiding applications; for example, high-power beam delivery using HC-PBFs and gas-based broadband (e.g., white light) generation (or supercontinuum generation) using HC-ARFs. Details on the design and manufacture of HC-PCFs can be found in U.S. patent application publication no. US2004175085 (for HC-PBFs) and European patent application publication no. EP3136143A1 (for HC-ARFs), which are both incorporated herein in their entireties by reference. HC-PBFs are configured to offer low loss but narrow bandwidth radiation guidance via a photonic bandgap effect established by the cladding structure surrounding a central hollow core. Whereas HC-ARFs are engineered to significantly broaden the transmission bandwidth via anti-resonant reflection of radiation from the cladding.

FIG. 7 depicts, in cross-section, two types of HC-ARFs. FIG. 7A shows an example of a Kagome fiber, comprising a Kagome lattice structure. FIG. 7B shows a single-ring or revolver of fibers, where the hollow core region is formed and surrounded by a layer of non-touching rings.

For gas-based broadband (e.g., white light) generation, a HC-ARF may be comprised within a gas cell, which is designed to operate, for example, at a pressure up to many 10s of bars (e.g., between 3-100 bar). A gas-filled HC-ARF can act as an optical frequency converter when being pumped by an ultrashort pump laser pulse with sufficient peak power. The frequency conversion from ultrashort pump laser pulses to broadband laser pulses is enabled by a complicated interplay of the dispersion and nonlinear optical processes inside the gas-filled fiber. The converted laser pulses are predominantly confined within the hollow core in the form of transverse core modes and guided to the fiber end. Part of the radiation, for example higher order transverse core modes or specific wavelengths, may leak from the hollow core through the inner cladding waveguide structure and undergoes strong attenuation during its propagation along the fiber. The core region and the cladding region of a HC-ARF can be configured such that the higher order core modes are phase matched to the higher order cladding modes. In this way, the higher order core modes can resonantly couple with the higher order cladding modes which subsequently get attenuated or suppressed. In such a manner, low loss and effectively single transverse mode transmission can be obtained in a broad spectral range.

One or more spatio-temporal transmission characteristics of a laser pulse, e.g. its spectral amplitude and phase, transmitted along a HC-PCF can be varied and tuned through adjustment of one or more pump laser parameters, one or more filling gas parameters and/or one or more fiber parameters. The transmission characteristics may include one or more selection from: output power, output mode profile, output temporal profile, width of the output temporal profile (or output pulse width), output spectral profile, and/or bandwidth of the output spectral profile (or output spectral bandwidth). The one or more pump laser parameters may include one or more selected from: pump wavelength, pump pulse energy, pump pulse width, and/or pump pulse repetition rate. The one or more fiber parameters may include one or more selected from: fiber length, size and/or shape of the hollow core, size and/or shape of the cladding structure, and/or thickness of the one or more walls surrounding the hollow core. The one or more filling gas parameters may include one or more selected from: gas type, gas pressure and/or gas temperature.

The filling gas can be an atomic gas such as argon, krypton, and/or xenon, and/or a molecular gas such as hydrogen, deuterium and/or nitrogen, or a gas mixture comprising two or more different gases, such as a mixture of argon and hydrogen, a mixture of xenon and deuterium, a mixture of krypton and nitrogen, or a mixture of nitrogen and hydrogen. Depending on the type of filling gas, the nonlinear optical processes can include modulational instability (MI), soliton fission, Kerr effect, Raman effect and dispersive wave generation, details of which are described in PCT patent application publication no. WO2018/127266A1 and U.S. Pat. No. 9,160,137B1 (both of which are hereby incorporated in their entireties by reference). Since the dispersion of the filling gas can be tuned by varying the gas cell pressure, the generated broadband pulse dynamics and the associated spectral broadening characteristics can be adjusted so as to optimize the frequency conversion. The generated broadband laser output can cover wavelengths from UV (e.g., <400 nm) to IR (e.g., >800 nm).

Existing HC-PCF based broadband sources can tend to suffer from fiber lifetime issues and may fail to function after only a short period of operation time. In the case where a HC-PCF based radiation source is used in a metrology tool, e.g., a scatterometer, unexpected and early failure of a HC-PCF means the whole radiation source will need to be removed from the tool in order to be repaired or replaced. After a replacement radiation source is fitted into the same metrology tool, a complete optical alignment of the laser beam as well as other necessary calibrations and characterizations need to be carried out again. The whole process not only adds cost but also causes a significant system downtime. Hence it is highly desirable to fully understand the failure mechanisms of HC-PCFs so as to find ways to improve/extend their lifetime.

At present, several failure mechanisms have been identified. A first failure mechanism is fiber contamination typically induced by hydrocarbon deposition on one or both fiber ends. There are cleaning methods available to address this contamination.

A second failure mechanism is fiber overheating. This issue is mainly caused by the fact that existing HC-PCF based radiation sources have not incorporated any effective thermal management measure to maintain the operating temperature of HC-PCFs. Broadband (e.g., white light) generation is accompanied by ionization and heat generation through atomic collisions in gas species and recombination dynamics in plasma. Such heat generated during operation will increase the temperature of the inner cladding surfaces of a fiber. However, for existing HC-PCFs e.g., such as illustrated in FIG. 7, fiber geometries do not allow access and efficient cooling of the surfaces of inner cladding waveguide structures. Without effective thermal dissipation, the generated heat will accumulate within the fiber, especially in the case of the fiber being pumped/driven with high repetition rate pulses, until the fiber is overheated and eventually damaged. Overheating of the surfaces of an inner cladding waveguide structure (e.g., glass or silica tubes such as illustrated in FIG. 7B) will also trigger unwanted chemical reactions which can produce outgassing and thus cause contamination. Hence, the overheating issue can negatively impact fiber lifetime and can impose limitations on further development of HC-PCF based radiation sources, e.g., power and/or repetition rate scaling.

A third failure mechanism is fiber inner cladding deformation. In a pure atomic gas environment such as krypton, broadband (e.g., white light) radiation generation also can cause mechanical deformation of the fiber cladding structure. As mentioned above, broadband generation causes both fiber heating and plasma generation. Plasma generation in a HC-PCF under a short temporal profile can cause a pressure shock wave due to sudden gas heating. This pressure change is proportional to the density of free electrons. The pressure wave, propagating as an acoustic wave in the cross-section of a HC-PCF, impinges on the one or more thin-walled elements (e.g., one or more cladding tubes) of the inner cladding waveguide structure and then impulsively excites several mechanical modes of the one or more elements, thereby making them vibrate at a superposition of the excited mechanical modes. The vibrations of the one or more elements, heated up to several hundreds of degrees due to, e.g., white light generation, result in temporal and permanent deformation of the one or more elements, and thus a deformed inner cladding waveguide structure.

Since the inner cladding waveguide structure is used as the radiation guidance mechanism such that radiation is confined predominantly inside the hollow core, a deformed inner cladding waveguide structure will result in loss of radiation, and in some severe cases, fiber damage. FIG. 8 shows two cross-section images taken at two different locations of a HC-PCF with a single-ring design operated with krypton as the sole filling gas: FIG. 8A shows a cross-section image taken at the fiber end; and FIG. 8B shows a cross-section image taken at a location a few centimeters away from the fiber end shown in FIG. 8A. It can be seen that the fiber tubes can be deformed along the fiber when exposed to a spatially-extended region of broadband (e.g., white light) generation.

Furthermore, there are several other factors which can exacerbate the acoustic wave induced mechanical deformation of the fiber cladding structure (e.g., one or more cladding tubes). First, in the case of using a working gas with a low thermal conductivity, poor thermal management of the fiber results in (over)heated one or more elements of the fiber cladding structure which makes them more susceptible to mechanical deformations.

In addition, the impact of the generated acoustic waves to the fiber cladding structure can be significantly amplified if the repetition rate of the pump pulses in a way reinforces and amplifies the amplitude of the excited mechanical modes of the one or more elements of the fiber cladding structure, e.g. when it is close to the resonance frequencies of the excited mechanical modes of one or more elements of the fiber cladding structure. As mentioned above, while a pump pulse is being nonlinearly broadened to a broadband or supercontinuum pulse within the hollow core of a HC-PCF, an acoustic (or pressure) wave is also excited as a result of sudden release of energy to the gas and heating it. In tube-type HC-PCFs such as shown in FIG. 7, at least some of the one or more elements of the fiber cladding structure will act as acoustic resonators upon impingement of the generated acoustic waves. Within each such acoustic resonator, interference can be formed between the incident and back-reflected acoustic waves. Hence, each acoustic resonator will have a resonance frequency which is predominantly determined by the element geometry, e.g., shape, cross-sectional width (e.g., diameter), wall thickness. When the repetition rate of the pump pulses is close or matches to a resonance frequency of the one or more elements of the fiber cladding structure, a resonance effect will occur which significantly enhances the amplitude of the mechanical vibrations of the associated one or more elements of the fiber cladding structure.

Fiber cladding deformation issue can be at least partially mitigated by adding a certain amount of hydrogen (or deuterium) to the working gas or gas mixture. The maximum mole fraction of hydrogen in a filling gas mixture may be around 4% due to safety regulations. At present, a typical mole fraction of hydrogen in a hydrogen containing filling gas mixture is around 2%.

The fiber cladding deformation issue is at least partly related to radiation-induced defects (color centers) in glass. Such defects when formed by exposing glass to UV photons could cause local mechanical stress and eventual deformation of a thin glass structure (e.g., a fiber cladding structure). Hydrogen and deuterium can be useful for healing such defects in a glassy matrix.

Moreover, mixing a small amount of hydrogen with a working gas is also found to be effective in damping acoustic waves generated in a HC-PCF. Gas mixtures can allow damping of the generated acoustic waves, due to diffusion-assisted acoustic wave attenuation. Both atomic and molecular gases can be used to mix with a commonly used working gas, e.g., krypton. As molecular gases have more internal degrees of freedom, they are more effective in acoustic damping than atomic gases. In other words, the vibrational and rotational relaxations in molecular gases improve the acoustic damping capability due to the coupling between molecular degrees of freedom, e.g., translational, rotational, and vibrational degrees of freedom. Molecular gases that are suitable for mixing with a working gas can be, for example, methane, nitrogen, oxygen or hydrogen.

However, a mixture of atomic gases can still provide considerable acoustic damping. It is proposed, therefore, to use atomic gas mixtures which improve acoustic wave damping with respect to a single working atomic gas. Such mixtures may comprise, for example, noble gas mixtures such as a mixture of krypton and helium, a mixture of krypton and neon, or a mixture of xenon and helium.

For a gas mixture with fixed concentrations of gas constituents, the amplitude damping of the generated acoustic wave is described by the equation below:

$$A(f) = A_0 * e^{(-\alpha(f)*z)} \qquad [1]$$

where f is the frequency, $\alpha(f)$ is the frequency dependent damping coefficient, and z is the propagation distance from the origin of the acoustic wave (e.g., the middle of the fiber core). Since the acoustic waves are successively generated by a train of pump pulses with a certain repetition rate/frequency $f_{pr}$, it would be therefore desirable, and proposed herein, to use a gas mixture in which the peak of the damping curve, corresponding to an optimal acoustic damping frequency, is matched or substantially close to the repetition rate $f_{pr}$ of the pump laser in order to have the maximum damping at that frequency. For a fixed mixture, one could also tune the $f_{pr}$ away from the resonance frequencies.

Although the mixing of a small amount of hydrogen with a working gas has been proposed and used to mitigate the fiber cladding deformation issue, the present inventors now appreciate that the introduction of hydrogen also helps mitigate the aforementioned thermal issue. This insight has not been appreciated before.

At present, krypton is often used in existing HC-PCF based broadband radiation sources as the working gas. Note that the working gas or gas mixture refers to the gas or gas mixture that is predominantly responsible for interacting with the input pump radiation and consequently generating of broadband radiation. The filling gas used in a HC-PCF based broadband radiation source may comprise only a working gas or gas mixture. Or alternatively, the filling gas may comprise a working gas or gas mixture and one or more other gases. The thermal conductivity of krypton is about 9.5 milliwatt per milliKelvin (mW/mK) at room temperature. This low thermal conductivity results in poor thermal management in HC-PCFs. In other words, a bare HC-PCF which is enclosed in a gas cell and embedded in krypton cannot efficiently dissipate heat generated during broadband (e.g., white light) generation. This is particularly true of, and of importance for, the inner surfaces of the fiber cladding structure that are in direct contact with broadband radiation. Since low thermal conductivity is a characteristic of most gaseous media, the aforementioned thermal problem is therefore a common issue for all those gases. The thermal conductivity of hydrogen is 186.9 mW/mK which is at least an order of magnitude higher than the commonly used working gas, e.g., krypton. A much higher thermal conductivity is helpful in improving thermal dissipation of a HC-PCF and consequently suppressing the aforementioned fiber overheating issue.

Although the addition of hydrogen into a working gas can successfully mitigate the aforementioned problems of HC-PCF based broadband radiation sources, this method on the other hand causes surface reduction and glassy growth issue which is also detrimental to the performance, in particular the lifetime of a HC-PCF based radiation source. After operating a HC-PCF based radiation source with a hydrogen containing gas mixture for over a few hundred hours, silicon oxides or $SiO_x$ nanostructures and fluffy glass can grow predominantly at the output tip of the fiber. One of the main root causes of the silicon dioxide growth is reduction of the inner fiber surfaces in the presence of hydrogen plasma. Reduction and etching of silicon dioxide in the presence of hydrogen plasma is a known phenomenon. Hydrogen ions and radicals, such as atomic hydrogen, attack the inner fiber surfaces and cause the reduction of the contacting surfaces by converting silica to silicon, or cause etching of the surfaces by creating volatile silicon monoxide. The growth of silicon dioxide at the end tip of a fiber results in gradual blockage and loss of output power, which will eventually lead to fiber damage and short lifetime of the radiation source. In addition to the surface reduction and glassy growth issue, the above mentioned 2% mole fraction of hydrogen is only an empirical value and the exact amount of hydrogen needed to minimize or prevent cladding structure deformation remains unknown.

To address some or all of these issues, therefore, a method for improving the lifetime of a gas filled HC-ARF based broadband radiation source is proposed. The proposed method is particularly suitable for extending the lifetime of a HC-PCF when operated in a gas environment for broadband, white light or supercontinuum generation. Different embodiments of the proposed method and associated apparatus will be disclosed below. One commonality shared between the disclosed embodiments is that the exclusive use of hydrogen for improving thermal conditioning and absorption of acoustic waves within the working gas is avoided in order to limit hydrogen related fiber lifetime limiting issues. As such, it is proposed that the filling gas used is one which comprises no more than, for example, 10 parts-per-million (ppm) hydrogen in mole fraction. For example, the only hydrogen comprised in the filling gas may be that which is naturally present (e.g., native hydrogen which may result from outgassing of materials, hydrocarbons, $H_2O$ on any surface and/or generated as part of the broadband generation process) as opposed to intentionally added hydrogen.

As illustrated in FIG. 9, a broadband radiation source device 100 comprises a pump laser 110 outputting a train of pump pulses 111, an optical component 120 spectrally broadening the input pump pulse and an optical diagnostic device 130 measuring the output broadband spectrum. The optical component 120 comprises a HC-PCF (e.g., a HC-ARF) 101 having a specific fiber length and a gas cell 102 filled with a filling gas or a gas mixture at a specific pressure or with a pressure distribution. The gas cell 102 further comprises an input optical window 103a and an output optical window 103b, located at respective ends of the gas cell 102. The input optical window 103a is operable to admit ultrashort pump laser pulses into the gas cell 102 via the window. After being coupled into the gas-filled HC-PCF 101, pump laser pulses 111 propagate along the fiber where they experience significant spectral broadening. Resultant broadband laser pulses are subsequently discharged from the gas cell 102 via the output optical window 103b and measured by the optical diagnostic device 130 (e.g. a spectrometer).

To fill the HC-PCF 101 with a filling gas, the gas cell 102 may be in communication with a pressurized gas supply or reservoir (not shown). The inner surfaces of the walls and windows 103a, 103b of the gas cell 102 enclose a cavity. The axis of the gas cell is parallel to the axis of the HC-PCF 101.

Figure 10A:
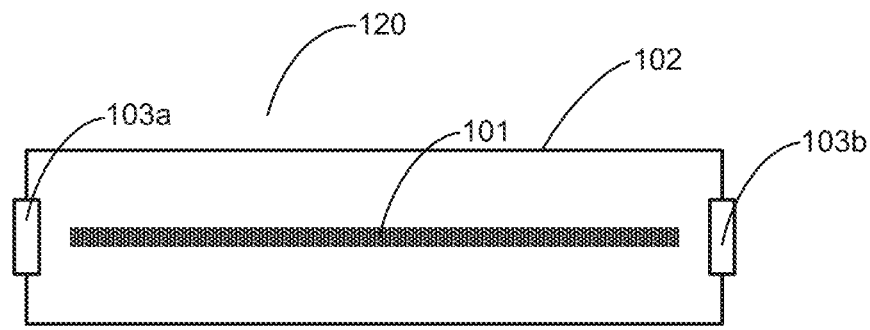
FIGS. 10A, 10B and 10C schematically depict examples of optical components in three different configurations.
Figure 10B:
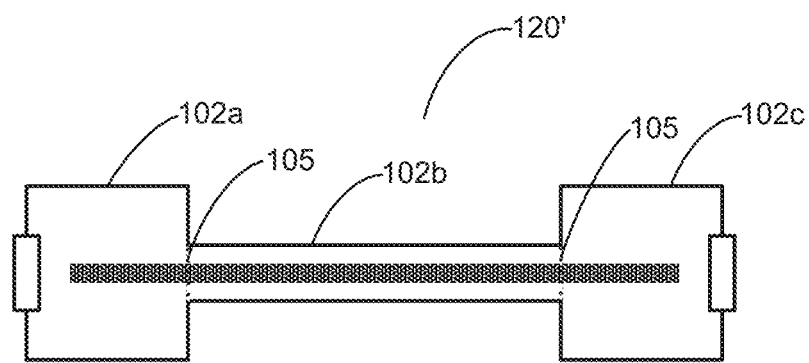
Figure 10C:
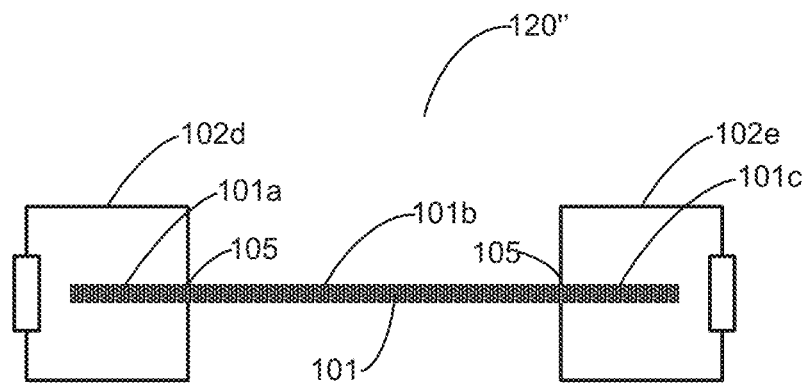

FIGS. 10A-C schematically depicts three configurations of the optical component 120, 120', 120''. FIG. 10A illustrates a first configuration where the entire HC-PCF 101 is comprised within a single gas cell 102. FIG. 10B illustrates an alternative arrangement where the entire HC-PCF 101 is comprised in several (e.g., three) sub-cells 102a, 102b, 102c which are interconnected by using an appropriate sealing mechanism 105. The pressure-tight connections ensure all the sub-cells reach the same pressure desired for broadband generation. FIG. 10C illustrates another configuration where the two fiber ends 101a, 101c of the HC-PCF 101 are comprised in two separate gas cells 102d, 102e respectively, while a central portion 101b of the fiber, acting as a fluid connection, is comprised outside of the gas cells.

Note that the configurations of the optical component 120, 120', 120'' illustrated in FIGS. 10A-C are only three examples. Many other different configurations are equally applicable. For example, in some embodiments, the optical component 120 may not use a single gas cell 102 or multiple sub-cells 102a-e to create a gas environment that at least partially encloses the HC-PCF 101. Instead, the HC-PCF 101 may be first filled with a filling gas and then sealed; for example, by attaching a mirror to each of the two ends of the fiber. In this way, the filling gas is kept within the fiber (e.g., the hollow core and cladding structure) without the need for a separate gas cell. The two mirrors may be configured in the same way as the mirrors illustrated in FIG. 9 in terms of allowable transmission bands.

In an embodiment, the filling gas of a HC-PCF based broadband radiation source may be a gas mixture comprising or consisting of helium and another gas or gas mixture. In the embodiment, helium may act as an alternative gas to hydrogen which is currently used to mitigate the cladding structure deformation and fiber overheating issues. Similar to hydrogen, helium has a high thermal conductivity, i.e., 156.7 mW/mK, and can therefore help to improve thermal management of a HC-PCF 101. Although a different molecular gas with a high thermal conductivity may also be used to replace hydrogen for the same purposes (described in the embodiments below), atomic gases are preferred due to for example the fact that molecular gases, such as hydrogen, oxygen, and $H_2O$, will dissociate after being exposing by radiation and turn into ions and radicals which subsequently attack glass and cause the surface reduction issue.

The second gas or gas mixture may act as the working gas for broadband (e.g., white light) generation. The second gas or gas mixture may be either an atomic gas or gas mixture or a molecular gas or gas mixture. As described above, a mixture of two or more atomic gases can help damp the generated acoustic waves and therefore mitigate the cladding structure deformation issue. Note that, in order to provide effective shock absorbing or acoustic damping properties, the two or more atomic gases of the filling gas mixture should have sufficiently different atomic masses required by diffusion assisted acoustic wave attenuation.

In some embodiments, the filling gas mixture may comprise or consist of helium and a second atomic gas used for broadband (e.g., white light) generation. The second atomic gas may be, for example, krypton, neon, argon, or xenon. In other embodiments, the filling gas mixture may comprise or consist of helium and a second atomic gas mixture. The second atomic gas mixture used for broadband (e.g., white light) generation may comprise at least another two different atomic gases, e.g., krypton and neon, krypton and argon, or krypton and xenon.

In different embodiments, the filling gas mixture may comprise or consist of helium, a second atomic gas or gas mixture and a molecular gas or gas mixture. The second atomic gas or gas mixture may be used as the working gas or gas mixture for broadband (e.g., white light) generation. Since molecular gases have more internal degrees of freedom than atomic gases, when mixing with helium containing atomic gas mixtures such as those in foregoing embodiments, they can further enhance acoustic damping capability. In some embodiments, the filling gas mixture may comprise helium, a second atomic gas or gas mixture and a molecular gas. The molecular gas for this purpose may be, for example, nitrogen, oxygen or $H_2O$. In other embodiments, the filling gas mixture may comprise helium, a second atomic gas or gas mixture and a molecular gas mixture. The molecular gas mixture may comprise for example, two or more selected from: nitrogen, oxygen or $H_2O$.

In some embodiments, the filling gas mixture may comprise or consist of helium and a different gas or gas mixture. Here, helium may be used to mitigate the fiber overheating issue and the cladding structure deformation issue. The different gas or gas mixture used as the working gas or gas mixture may be carefully chosen to determine one or more desired properties, e.g., spectral range and/or spectral profile, for broadband radiation generation in a gas filled HC-PCF based radiation source. For example, by properly choosing the type of the gas or the composition of the gas mixture, it may be possible to generate broadband radiation predominantly in ultraviolet (UV) region or infrared (IR) region. In the case where a broadband UV spectrum is preferred, the filling gas mixture may comprise or consist of helium and a molecular gas or gas mixture comprising nitrogen, or an atomic gas such as argon or krypton, for example. Whereas, in the case where a broadband IR spectrum is preferred, the filling gas mixture may comprise or consist of, for example, helium and xenon.

In some embodiments, the concentration or mole fraction of helium in a helium containing filling gas mixture may be optimized in such a way that a balance between thermal conduction and convection for releasing of the excess heat from the fiber is obtained. In other words, the cladding structure deformation and fiber overheating issues may be mitigated by optimizing the helium concentration of the filling gas mixture. The choice of the filling gas mixture may be dependent on factors such as, for example, one or more selected from: an output characteristic (e.g., power, spectrum) of the radiation source, acceptable total gas pressure, and/or preferred method of heat dissipation. The addition of helium in the filling gas mixture can enable the heat dissipation mechanism by increasing the thermal conductivity and thermal diffusivity of the filling gas mixture.

Figure 11:
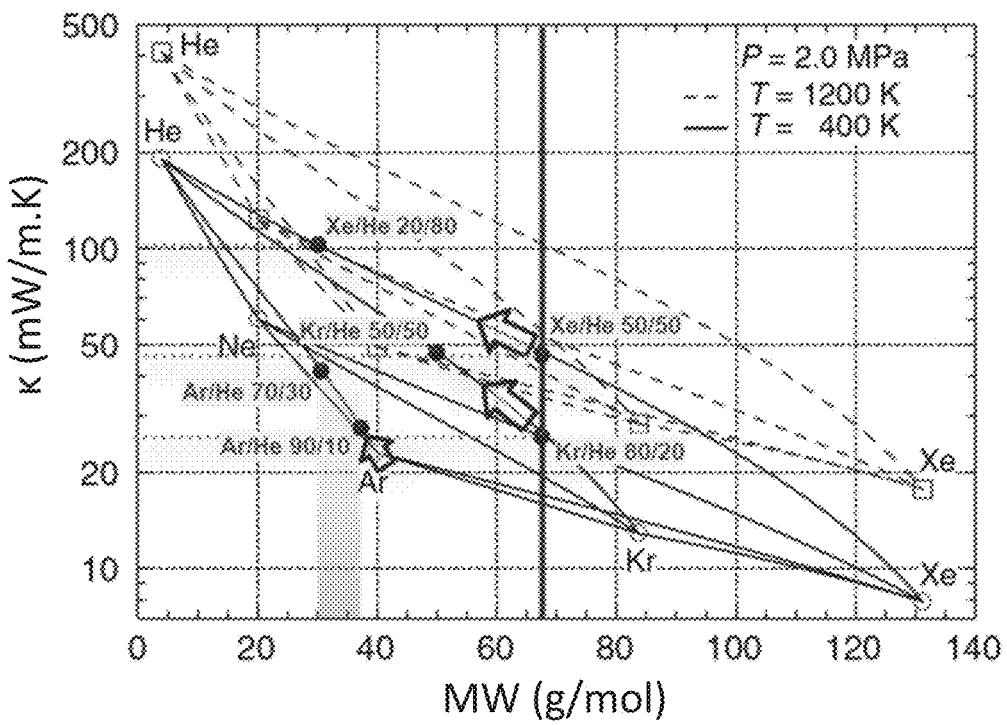
FIG. 11 is a plot illustrating the thermal conductivity of several binary mixtures of atomic gases as a function of molecular weight.

As described above, helium may be used as an alternative gas to hydrogen for mitigating the cladding structure deformation and fiber overheating issues due to its high thermal conductivity and suitability for acoustic damping. The thermal conductivity of a helium containing gas mixture changes with the helium concentration. FIG. 11 is a plot illustrating the thermal conductivity of several binary mixtures of atomic gases as a function of molecular weight. In the plot of FIG. 11, the thermal conductivity ($\kappa$) of each gas mixture is characterized at a pressure of 20 bar (or 2.0 megapascal (MPa) as indicated in the Figure) for two different temperatures, i.e. 1200 K and 400 K. Molecular weight (MW) of each gas mixture is the average of the individual molecular weights weighted with their respective percentages. Each of the empty circles in FIG. 11 represents thermal conductivity of an atomic gas (e.g., helium (He), neon (Ne), argon (Ar), krypton (Kr), or xenon (Xe)) at the temperature of 400 K; each of the empty squares in the figure represents thermal conductivity of an atomic gas (e.g., He, Ne, Ar, Kr, or Xe) at the temperature 1200 K. Each solid line connects a pair of two empty circles and indicates the range in which the thermal conductivity of the binary mixture consisting of two atomic gases represented by the two empty circles changes with the molecular weight of the gas mixture at the temperature of 400 K. Likewise, each dashed line connecting a pair of two empty squares indicates the range in which the thermal conductivity of the binary mixture consisting of two atomic gases represented by the two empty squares changes with the molecular weight of the gas mixture at the temperature of 1200 K.

Solid circles represent thermal conductivities of some example gas mixtures which may be used as the filling gas mixture for gas filled HC-PCF based radiation sources. The two gas mixtures, i.e. a first mixture consisting of 50% xenon and 50% helium in mole fractions (or Xe/He 50/50) and a second mixture consisting of 80% krypton and 20% helium in mole fractions (or Kr/He 80/20) as represented by the two solid circles on the solid line, may be used in HC-PCF based broadband radiation sources operated at high repetition frequencies (e.g., 1 MHz, 2.5 MHz, 5 MHz, 10 MHz, 20 MHz, 30 MHz, 40 MHz, or 80 MHz). Note that, the thermal conductivities of the example gas mixtures in the Figure are for the given temperature and total gas pressure (e.g., 400 K and 20 bar). Those example gas mixtures will have different thermal conductivities when operating under different conditions (e.g., a different total gas pressure and/or a different temperature).

It is evident in the Figure that for any helium containing filling gas mixture, increasing the helium concentration (or mole fraction) of the gas mixture decreases the molecular weight and increases the thermal conductivity. In the meantime, increasing the helium concentration of the gas mixture decreases the partial pressure of the working gas (e.g., Ne, Ar, Kr, or Xe). Since the output performance of a HC-PCF based radiation source is dependent on the partial pressure of the working gas (thus the optical nonlinearity), it is desirable to increase the total gas pressure so as to maintain the same partial pressure for the working gas. The total gas pressure is defined as the sum of partial pressures of constituent gases of the filling gas mixture. Therefore, a balance between thermal conductivity and optical nonlinearity needs to be obtained when it comes to determine an optimal concentration (or mole faction) of helium in the filling gas mixture.

With reference to FIG. 11, different filling gas mixture configurations may be categorized into, for example, three main groups based on the thermal conductivity of the corresponding working gas. The first group may comprise filling gas mixtures with a high thermal conductivity. In the first group, each filling gas mixture may have a thermal conductivity e.g., between 75% and 100% of the thermal conductivity of pure helium at a given temperature and pressure. The second group may comprise filling gas mixtures with a moderate thermal conductivity. In the second group, each filling gas mixture may have a thermal conductivity e.g., between 35% and 75% of the thermal conductivity of pure helium at a given temperature and pressure. The third group may comprise filling gas mixtures with a low thermal conductivity. In the third group, each filling gas mixture may have a thermal conductivity e.g., between 0 and 35% of the thermal conductivity of pure helium at a given temperature and pressure.

For each filling gas mixture of the first group, the working gas (e.g., xenon) may have a higher degree of ionizability and the resulting overheating issue may have a higher level of severity. Hence, the working gas may be mixed with a higher mole fraction of helium in order to achieve a higher thermal conductivity for mitigating the overheating issue. For example, the filling gas mixture may consist of 10% xenon and 90% helium, or consist of 20% xenon and 80% helium in mole fractions. Such a filling gas mixture has a very high concentration of helium and thus allows for a high thermal conductivity. Such filling gas mixtures may be operated at a higher total gas pressure (e.g., 40 bar) in order to maintain a desired partial pressure for the working gas (e.g., xenon).

For each filling gas mixture of the second group, the working gas (e.g., argon or krypton) may have a lower degree of ionizability and the resulting overheating issue may be less severe than for the filling gas mixtures of the first group. Accordingly, a lower helium concentration may be used for the helium containing filling gas mixture. For example, the filling gas mixture may consist of 50% krypton and 50% helium, or 70% argon and 30% helium in mole fractions. This has an advantage of keeping the total working pressure of the gas mixture to an easily handleable level, e.g. below 50 bar.

For each filling gas mixture of the third group, the degree of ionizability of the working gas (e.g., argon or neon) may be similar to or lower than that of the second group. By comparison, the filling gas mixtures of the third group may have a lower helium concentration and thus a lower thermal conductivity than those of the second group. Similar to the first group, the filling gas mixtures of the second and third groups may be operated at a higher total gas pressure (e.g., 50-70 bar) in order to maintain a desired partial pressure for the corresponding working gas.

Additional example filling gas mixtures are provided in Table 1. Note that, although the table below only lists binary atomic gas mixtures, i.e. consisting of two different atomic gases, it is not meant to exclude the applicability of other types of gas mixtures, such as, for example, a filling gas mixture comprising or consisting of more than two atomic gases, or a filling gas mixture comprising or consisting of one or more atomic gases and one or more molecular gases.

TABLE 1

| Gas mixture | Mole fraction of Gas-1 | Mole fraction of Gas-2 |
| --- | --- | --- |
| Ar (Gas-1) and He (Gas-2) | 100 − X | X (X ≥ 10%) |
| Kr (Gas-1) and He (Gas-2) | 100 − X | X (X ≥ 20%) |
| Xe (Gas-1) and He (Gas-2) | 100 − X | X (X ≥ 50%) |

As shown in Table 1, each example filling gas mixture consists of helium and another heavier atomic gas. The mole fractions of helium (Gas-2) and the heavier atomic gas (Gas-1) are denoted by X and 100-X, respectively. For each binary atomic gas mixture in the table, e.g., Ar and He, Kr and He, or Xe and He, a preferred range of mole fraction of helium is provided. For example, for a gas mixture of xenon and helium, the mole fraction of helium is preferred to be equal to or higher than 50%.

Figure 12:
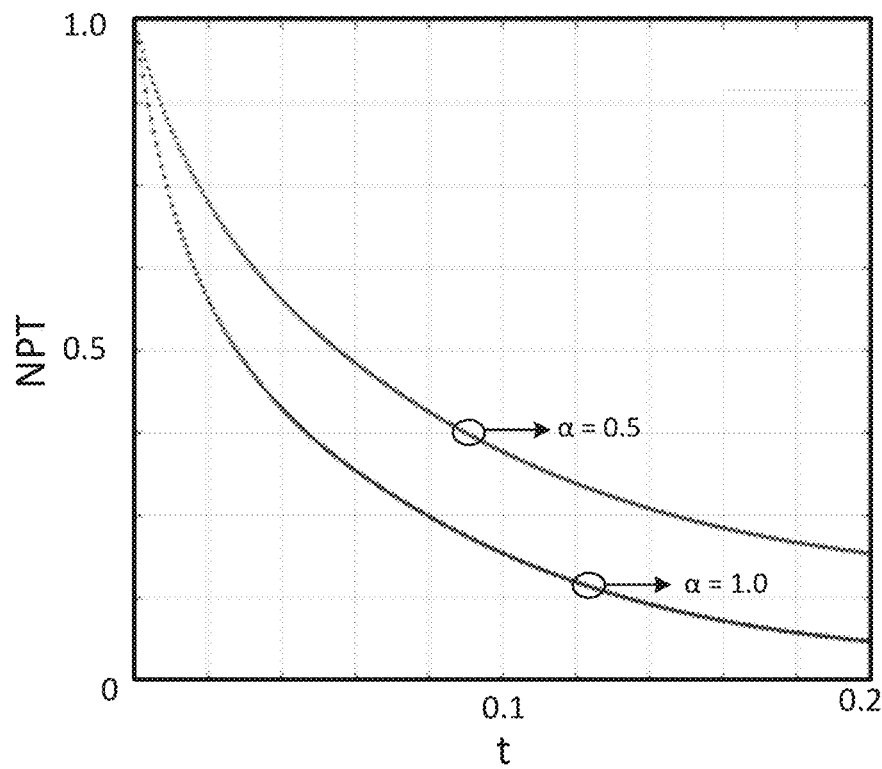
FIG. 12 is a plot showing simplified simulations of heat relaxation in a HC-PCF for two different thermal diffusivities.

Thermal diffusivity is a measure of how quickly the heat gradient generated by one pulse in the center of the fiber (i.e. at the point of maximum intensity and ionization) is smoothened or diffused in the system (e.g., a gas filled HC-PCF) and can be expressed as follows:

$$\alpha = \frac{\kappa}{\rho \times C_p} \quad [2]$$

where κ denotes the thermal conductivity of the filling gas mixture, ρ denotes the density of the filling gas mixture and $C_p$ denotes the heat capacity of the filling gas mixture. To prevent hot gas from reaching high steady-state temperatures under the action of subsequent laser pulses, it is desirable to reduce the timescale of the relaxation of the heat gradient such that it is shorter than pulse separation time (i.e. the inverse of the laser repetition rate). According to equation [2], the increase of the thermal conductivity of the filling gas mixture as a result of adding more helium also results in the increase of thermal diffusivity. In addition to using a filling gas mixture with a high conductivity, a higher thermal diffusivity can be obtained by configuring the filling gas mixture such that it has a lower density and/or lower heat capacity. FIG. 12 is a plot showing simplified simulations of heat relaxation in the fiber for two different thermal diffusivities. As shown in the Figure, the vertical axis is the normalized peak temperature (NPT) of the fiber (e.g., the HC-PCF 101) and the horizontal axis is time. The Figure confirms that the filling gas mixture with a higher thermal diffusivity (e.g., α=1.0) results in a much faster (e.g., two times faster) heat relaxation in the fiber (e.g., the HC-PCF 101) than the filling gas mixture with a lower thermal diffusivity (e.g., α=0.5).

As described above, the choice of the filling gas mixture may also be dependent on the preferred heat transfer mechanism, e.g., convective heat transfer or conductive heat transfer. Conductive heat transfer occurs by means of molecular excitement within a material without bulk motion; whereas convective heat transfer occurs due to bulk movement of the fluid (e.g., filling gas) relative to a boundary. In cases where heavy atomic gases are used as the working gas (e.g. Kr or Xe) for generating broadband radiation in a HC-PCF, it is preferred that heat relaxation produces less convection or momentum transfer of the heavy working gas. The reason is that convection of the heavy working gas may produce a gas flow in the fiber as a result of a temperature gradient formed inside and outside or across the cross section of the fiber. The flow of the hot heavy working gas may result in the pump pulses being subjected to a varying refractive index of the medium through which they travel (working gas). The local change in the refractive index profile in turn may result in radiation output instability (e.g., power instability, spectrum instability). Addition of helium to the heavy working gas may allow the heat transfer to happen predominantly via the movement of light helium atoms which can freely move through the heavy gas atoms, in a manner similar to the heat transfer in metals via the movement of free light electrons relative to the heavy ions. Due to its low optical nonlinearity, helium does not affect the output of the radiation source and only helps with the transfer of excess heat generated in the fiber.

Note that the above description for choosing an optimal filling gas mixture for mitigating the cladding structure deformation and fiber overheating issues is equally applicable for cases where a filling gas mixture comprises helium and a working gas mixture comprising two or more atomic gases (rather than comprising a single atomic gas as described in the above example gas mixtures), or where a filling gas mixture comprises helium and a working gas mixture comprising one or more atomic gases and one or more molecular gases. In any case, the filling gas mixture may be optimally chosen by simultaneously taking account of its thermal conductivity, thermal diffusivity and heat transfer mechanism.

According to equation [1], the strength of acoustic damping of pressure shock waves is dependent on the pump pulse repetition rate. Therefore, in an embodiment, a helium containing filling gas mixture may be configured such that the optimal acoustic damping frequency is matched or substantially close to a repetition rate of the pump pulses. In some embodiments, the repetition rate of the pump laser may be tuned to match or be substantially close to the optimal acoustic damping frequency of the filling gas or gas mixture. In other embodiments, a suitable filling gas or gas mixture with an optimal acoustic damping frequency that is matched or substantially close to the pump pulse repetition rate may be selected.

The pump-gas frequency matching feature may be used alone or in combination with any foregoing embodiment(s) in order to maximize the acoustic damping strength of the corresponding filling gas mixture. For example, in an embodiment, the filling gas mixture comprising or consisting of helium and nitrogen may have an optimal acoustic damping frequency that is exactly matched to the repetition rate of pump pulses. As such, the gas filled HC-PCF based radiation source can simultaneously generate broadband UV radiation (determined by nitrogen) and have an extended fiber lifetime with minimized impact from fiber overheating (e.g., mitigated by using helium) and cladding tube deformation (mitigated by using a mixture of nitrogen and helium together with the pump-gas frequency matching feature) issues.

Since the acoustic resonance effect induced by the cladding structure, e.g., cladding tubes, can amplify the impact of the acoustic waves, it is also preferable to ensure the pump pulse repetition rate is different to one or more resonance frequencies of the excited resonant modes within the cladding structure (e.g., cladding tubes) of the HC-PCF. In some embodiments, the repetition rate of the pump laser may be tunable such that the resonance effect can be avoided. Alternatively, acoustic impedance of the HC-PCF, as seen by the acoustic waves generated during broadband radiation generation, may be configured to substantially prevent excitation of resonant modes within the cladding structure of the HC-PCF after being impinged by the acoustic waves. In some embodiments, the prevention of excitation of resonant modes within the cladding structure may be obtained by carefully selecting a suitable gas composition for the filling gas mixture and/or by carefully selecting a HC-PCF with a suitable fiber geometry.

Similar to the pump-gas frequency matching feature, the above described pump-cladding anti-resonance feature may be used alone or in combination with any foregoing embodiment(s). For example, in a different embodiment, the pump-cladding anti-resonance feature may be applied to the above embodiment where the filling gas comprises or consists of helium and nitrogen and the optimal acoustic damping frequency matches to the pump pulse repetition rate. This embodiment can help ensure the maximized acoustic damping strength is not compromised by the resonance effect of the cladding tube.

In some embodiments, a certain thermal management measure may be taken to improve the thermal dissipation of the gas cell. A gas cell with improved thermal dissipation may facilitate effective removal of the heat transferred from the HC-PCF to the gas cell via the helium containing filling gas or gas mixture. In some embodiments, the gas cell may be connected to an efficient cooling system that can quickly remove heat from the gas cell body. In different embodiments, the gas cell may be built with materials with high thermal conductivities. Again, the improved gas cell with higher thermal dissipation may be used in combination with any foregoing embodiment(s).

In all of the above embodiments, the filling gas mixture contains a certain amount of helium. In comparison to hydrogen containing filling gas mixtures, helium containing filling gas mixtures not only mitigate the fiber overheating and cladding structure deformation issues but also prevents the surface reduction issue that is otherwise present when using hydrogen containing filling gas mixtures. It should be appreciated that even without intentionally introducing hydrogen, the filling gas or gas mixture may still comprise minute amounts of hydrogen, which could come from outgassing, hydrocarbons, or $H_2O$ on any surface and/or generated as part of the broadband generation process. However, such residual or naturally present hydrogen is insufficient to act to mitigate any of the aforementioned problems or to cause glass surface reduction.

In an embodiment, the filling gas mixture may consist of 50% helium and 50% krypton in mole fractions. However, other mole fractions of helium may also be applicable. The mole fraction of helium may be or greater than 2% of the filling gas mixture, e.g., equal to or greater than 10% or 50% of the filling gas mixture. For example, the mole fraction of helium may be between 10% and 90%, between 20% and 80%, between 30% and 70%, between 40% and 60%, between 45% and 55%, or between 55% and 65%; and more specifically it may be: 2%, 10%, 20%, 30%, 40%, 50%, 60%, 70% or 80% of the filling gas mixture. In the above, "comprises" describes including these gases, but not necessarily to the exclusion of other gases and "consists of" describes comprising only these gases.

Although helium (or another noble gas) is a very useful gas medium and can mitigate both fiber overheating and cladding structure deformation issues, some embodiments may use a filling gas mixture that does not comprise helium. In some embodiments, one or more selected from: the pump-gas frequency matching feature, the pump-cladding anti-resonance feature and/or the thermally dissipated gas cell feature may be applied to a filling gas or gas mixture that does not comprise helium. In an embodiment, all of the above three features are used with a filling gas mixture that does not comprise helium. Since the pump-gas frequency matching feature and the pump-tube anti-resonance feature can mitigate the cladding tube deformation issue and the thermally dissipated gas cell feature can mitigate the fiber overheating issue, the fiber lifetime can still be extended even when no helium is used. The embodiment may further prevent the surface reduction issue by avoiding using a significant amount of hydrogen in the filling gas mixture.

As such, a method for optimizing the repetition rate of the pump radiation such that it is unmatched to any of the acoustic resonance frequencies of an inner cladding structure of the HC-PCF, and a method for substantially matching an optimal acoustic damping frequency of the gas medium to a repetition rate of the pump radiation generated by the pump radiation source are also envisaged. The optimizing or matching may be achieved, for example, by suitable tuning of one or more pump radiation parameters, optimization of the gas mixture or both.

The HC-PCF used in such an embodiment may be a HC-ARF which may employ the Kagome design or the single-ring design with reference to FIG. 7. Alternatively, other fiber designs (not shown) such as inhibited coupling designs, hypocycloid-core Kagome, and/or nested tubular designs may be used. The pump pulse duration may be chosen to be greater than 100 fs, and more specifically within the range of: 100 fs to 100 ps, 100 fs to 30 ps or 100 fs to 1 ps for example. The chosen pump pulse may be 100 fs, 150 fs, 200 fs, 250 fs, 300 fs, 350 fs, 400 fs, 450 fs, 500 fs, 600 fs, 700 fs, 800 fs, 900 fs, 1 ps, 10 ps, 20 ps, 30 ps, or 100 ps. The pump wavelength may be chosen from the visible regime, near-IR regime or mid-IR regime. The pump laser pulses may have a repetition frequency of several-hundred hertz (Hz), kilohertz (kHz), or megahertz (MHz). In particular the repetition rate may be chosen to be in the range of 300 kHz to 100 MHz, such as 300 kHz, 500 kHz, 1 MHz, 5 MHz, 10 MHz, 20 MHz, 30 MHz, 40 MHz.

A broadband radiation source device configured to extend lifetime of a HC-PCF is disclosed herein and comprises a helium containing filling gas mixture.

A broadband radiation source device configured to extend lifetime of a HC-PCF is disclosed herein, wherein the pump pulse repetition rate and the optimal acoustic damping frequency of the filling gas mixture are matched or substantially close to each other.

A broadband radiation source device configured to extend lifetime of a HC-PCF is disclosed herein and comprises an optical component which may be configured to any one of the configurations with reference to FIG. 10.

Further embodiments of are disclosed in the list of numbered clauses below:

1. A broadband light source device configured for generating a broadband output upon receiving pump radiation, the broadband light source comprising:
    an optical component, comprising:
        a hollow-core photonic crystal fiber (HC-PCF); and
        a gas mixture filling the HC-PCF,
        wherein the gas mixture comprises a mixture of at least one first gas configured for the generation of broadband radiation and at least one second gas configured to improve thermal conductivity of the gas mixture and/or provide acoustic damping of shock waves initiated during the generation of broadband radiation,
        wherein the gas mixture comprises no more than 10 parts-per-million (ppm) hydrogen in mole fraction.

2. A broadband light source device configured for generating a broadband output upon receiving pump radiation, the broadband light source comprising:
    an optical component, comprising:
        a hollow-core photonic crystal fiber (HC-PCF); and
        a gas mixture filling the HC-PCF,
        wherein the gas mixture comprises a mixture of at least one first gas configured for the generation of broadband radiation and at least one second gas configured to improve thermal conductivity of the gas mixture and/or provide acoustic damping of shock waves initiated during the generation of broadband radiation,
        wherein the gas mixture comprises no more than 4% hydrogen in mole fraction.

3. The broadband light source device according to clause 1 or clause 2, wherein the at least one second gas comprises or consists of an atomic gas.

4. The broadband light source device according to clause 3, wherein the at least one second gas comprises or consists of helium.

5. The broadband light source device according to clause 3 or clause 4, wherein the at least one first gas comprises or consists of an atomic gas having a greater atomic weight than the at least one second gas.

6. The broadband light source device according to clause 5, wherein the at least one first gas comprises or consists of one or more selected from: krypton, xenon, argon, neon.

7. The broadband light source device according to any preceding clause, wherein the at least one first gas comprises or consists of one or more molecular gases.

8. The broadband light source device according to any preceding clause, wherein the at least one second gas comprises or consists of one or more molecular gases.

9. The broadband light source device according to clause 8, wherein the one or more molecular gases are selected from: nitrogen, oxygen, $H_2O$.

10. The broadband light source device according to any preceding clause, wherein the at least one second gas constitutes at least 2% of the gas mixture in mole fraction.

11. The broadband light source device according to any of clauses 1 to 9, wherein the at least one second gas constitutes at least 10% of the gas mixture in mole fraction.

12. The broadband light source device according to any of clauses 1 to 9, wherein the at least one second gas constitutes between 30% and 70% of the gas mixture in mole fraction.

13. The broadband light source device according to any of clauses 1 to 9, wherein the at least one second gas constitutes between 40% and 60% of the gas mixture in mole fraction.

14. The broadband light source device according to any of clauses 4 to 9, wherein the at least one first gas consists of xenon and the at least one second gas consists of helium, the at least one second gas constituting a mole fraction of equal to or higher than 50%.

15. The broadband light source device according to clause 14, wherein the at least one first gas consists of xenon constituting 20% or less of the gas mixture in mole fraction and the at least one second gas consists of helium constituting 80% or more of the gas mixture in mole fraction.
16. The broadband light source device according to clause 14, wherein the at least one first gas consists of xenon constituting 10% or less of the gas mixture in mole fraction and the at least one second gas consists of helium constituting 90% or more of the gas mixture in mole fraction.
17. The broadband light source device according to any of clauses 4 to 9, wherein the at least one first gas consists of krypton and the at least one second gas consists of helium, the at least one second gas constituting a mole fraction of equal to or higher than 20%.
18. The broadband light source device according to clause 17, wherein the at least one first gas consists of krypton and the at least one second gas consists of helium, constituting respectively 50%±10% and 50%∓10% of the gas mixture in mole fractions.
19. The broadband light source device according to any of clauses 4 to 9, wherein the at least one first gas consists of argon and the at least one second gas consists of helium, the at least one second gas constituting a mole fraction of equal to or higher than 10%.
20. The broadband light source device according to clause 19, wherein the at least one first gas consists of argon constituting 70% or less of the gas mixture in mole fraction and the at least one second gas consists of helium, the at least one second gas constituting 30% or more of the gas mixture in mole fraction.
21. The broadband light source device according to clause 19, wherein the at least one first gas consists of argon constituting 90% or less of the gas mixture in mole fraction and the at least one second gas consists of helium, the at least one second gas constituting 10% or more of the gas mixture in mole fraction.
22. The broadband light source device according to any preceding clause, wherein the HC-PCF comprises a single ring HC-PCF.
23. The broadband light source device according to any preceding clause, further comprising a pump radiation source for generating the pump radiation.
24. The broadband light source device according to clause 23, wherein an optimal acoustic damping frequency of the gas mixture is substantially matched to a repetition rate of the pump radiation generated by the pump radiation source.
25. The broadband light source device according to clause 24, wherein the gas composition of the gas mixture is configured for the matching of the optimal acoustic damping frequency of the gas mixture to the repetition rate of the pump radiation.
26. The broadband light source device according to clause 24 or clause 25, configured to tune the repetition rate of the pump radiation to match the optimal acoustic damping frequency of the gas mixture.
27. The broadband light source device according to any of clauses 23 to 26, wherein the pump radiation source is configured such that the repetition rate of the pump radiation is unmatched with any of acoustic resonance frequencies of an inner cladding structure of the HC-PCF.
28. The broadband light source device according to any preceding clause, wherein an inner cladding structure of the HC-PCF comprises one or more silica tubes.
29. The broadband light source device according to any preceding clause, wherein the gas mixture is configured to define a spectral range of the generated broadband radiation.
30. The broadband light source device according to any preceding clause, wherein the broadband output comprises a wavelength range of 200 nm to 3000 nm, or a sub-range within this range such as 400-2000 nm.
31. A metrology device comprising the broadband light source device according to any preceding clause.
32. The metrology device according to clause 31, comprising a scatterometer metrology apparatus, a level sensor or an alignment sensor.
33. A method for configuring a source arrangement configured for generating a broadband radiation output and comprising:
a pump radiation source for outputting pump radiation; and
a hollow-core photonic crystal fiber (HC-PCF)
a gas mixture filling the HC-PCF, wherein the method comprises:
substantially matching an optimal acoustic damping frequency of the gas medium to a repetition rate of the pump radiation generated by the pump radiation source.
34. The method according to clause 33, comprising optimizing a gas composition of the gas medium to match the optimal acoustic damping frequency of the gas medium to the repetition rate of the pump radiation.
35. The method according to clause 33 or clause 34, comprising tuning the repetition rate of the pump radiation to match the optimal acoustic damping frequency of the gas medium.
36. The method according to any of clauses 33 to 35, comprising optimizing the repetition rate of the pump radiation such that it is unmatched to any of the acoustic resonance frequencies of an inner cladding structure of the HC-PCF.
37. A method for configuring a source arrangement configured for generating a broadband radiation output and the source arrangement comprising:
a pump radiation source for outputting pump radiation;
a hollow-core photonic crystal fiber (HC-PCF); and
a gas mixture filling the HC-PCF, wherein the method comprises:
optimizing a repetition rate of the pump radiation such that it is unmatched to any of the acoustic resonance frequencies of an inner cladding structure of the HC-PCF.
38. The method according to any of clauses 33 to 37, wherein the gas mixture comprises at least one first gas and at least one second gas, wherein the at least one first gas is configured for the generation of broadband radiation and the at least one second gas is configured to improve thermal conductivity of the gas mixture and/or provide acoustic damping of shock waves initiated during the generation of broadband radiation, and the gas mixture comprises no more than 10 parts-per-million (ppm) hydrogen in mole fraction.
39. The method according to clause 38, wherein the at least one second gas comprises an atomic gas.
40. The method according to clause 39, wherein the at least one second gas comprises helium.
41. The method according to clause 39 or clause 40, wherein the at least one first gas comprises an atomic gas having a greater atomic weight than the second atomic gas.

42. The method according to clause 41, wherein the first atomic gas is selected from: krypton, xenon, argon, neon.

43. A method for configuring a source arrangement configured for generating a broadband radiation output and the source arrangement comprising:
a pump radiation source for outputting pump radiation;
a hollow-core photonic crystal fiber (HC-PCF); and
a gas mixture filling the HC-PCF, wherein the method comprises:
optimizing the mole fraction of helium in the gas mixture by optimizing one or more selected from:
thermal conductivity of the gas mixture;
thermal diffusivity of the gas mixture; or
heat transfer mechanism.

44. The method according to clause 43, wherein the optimizing of the heat transfer mechanism comprises choosing a gas or gas mixture with a heavy molecular weight for the at least one first gas.

45. The method according to clause 44, wherein the molecular weight of the at least one first gas is heavier than that of helium by at least a factor of 10.

46. The method according to any of clauses 44 or 45, wherein partial pressure of each constituent gas of the gas mixture is substantially maintained while the mole fraction of helium is being optimized.

47. An optical component for a broadband light source device, the optical component configured for generating a broadband output upon receiving pump radiation and comprising:
a hollow-core photonic crystal fiber (HC-PCF); and
a gas mixture filling the HC-PCF, wherein the gas mixture comprises a mixture of at least one first gas configured for the generation of broadband radiation and at least one second gas comprising or consisting of helium.

48. The optical component according to clause 47, wherein the at least one first gas comprises or consists of one or more of: krypton, xenon, argon, neon.

49. The optical component according to clause 47 or clause 48, wherein the at least first gas comprises or consists of one or more molecular gases.

50. The optical component according to any of clauses 47 to 49, wherein the at least one second gas comprises one or more molecular gases.

51. The optical component according to clause 50, wherein the one or more molecular gases are selected from: nitrogen, oxygen, $H_2O$.

52. The optical component according to any of clauses 47 to 51, wherein the at least one second gas constitutes at least 2% of the gas mixture in mole fraction.

52. The optical component according to any of clauses 47 to 51, wherein the at least one second gas constitutes at least 10% of the gas mixture in mole fraction.

53. The optical component according to any of clauses 47 to 51, wherein the at least one second gas constitutes between 30% and 70% of the gas mixture in mole fraction.

54. The optical component according to any of clauses 47 to 51, wherein the at least one second gas constitutes between 40% and 60% of the gas mixture in mole fraction.

55. The optical component according to clause 47, wherein the at least one first gas consists of xenon and the at least one second gas consists of helium, the at least one second gas constituting a mole fraction of equal to or higher than 50%.

56. The optical component according to clause 55, wherein the at least one second gas consists of helium constituting 80% or more of the gas mixture in mole fraction.

57. The optical component according to clause 55, wherein the at least one second gas consists of helium constituting 90% or more of the gas mixture in mole fraction.

58. The optical component according to clause 47, wherein the at least one first gas consists of krypton and the at least one second gas consists of helium, the at least one second gas constituting a mole fraction of equal to or higher than 20%.

59. The optical component according to clause 58, wherein the at least one first gas consists of krypton and the at least one second gas consists of helium, constituting respectively 50%±10% and 50%∓10% of the gas mixture in mole fractions.

60. The optical component according to clause 47, wherein the at least one first gas consists of argon and the at least one second gas consists of helium, the at least one second gas constituting a mole fraction of equal to or higher than 10%.

61. The optical component according to clause 60, wherein the at least one first gas consists of argon constituting 70% or less of the gas mixture in mole fraction and the at least one second gas consists of helium, the at least one second constituting 30% or more of the gas mixture in mole fraction.

62. The optical component according to clause 60, wherein the at least one first gas consists of argon constituting 90% or less of the gas mixture in mole fraction and the at least one second gas consists of helium, the at least one second gas constituting 10% or more of the gas mixture in mole fraction.

63. The optical component according to any of clauses 47 to 62, wherein the HC-PCF is a single ring HC-PCF.

64. A method for configuring an optical component for a source arrangement configured for generating a broadband radiation output, the method comprising:
selecting a hollow-core photonic crystal fiber (HC-PCF) and a gas mixture comprising a first gas filling the HC-PCF; and
determining an optimized mole fraction of helium to be present within the gas mixture, wherein the optimized mole fraction of helium is based on one or more selected from:
improving thermal conductivity of the gas mixture;
improving thermal diffusivity of the gas mixture; or
selecting of a desired heat transfer mechanism.

65. The method according to clause 64, further comprising selecting a gas or gas mixture with a heavy molecular weight for the first gas in order to select the desired heat transfer mechanism.

66. The method according to clause 65, wherein the molecular weight of the at least one first gas is heavier than that of helium by at least a factor of 10.

67. The method according to clause 65 or clause 66, wherein the partial pressure of each constituent gas of the gas mixture is substantially maintained while the mole fraction of helium is being determined.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A source device configured to generate a broadband radiation output upon receipt of pump radiation, the broadband radiation source comprising:
    an optical component, comprising:
        a hollow-core photonic crystal fiber (HC-PCF), and
        a gas mixture filling the HC-PCF, wherein the gas mixture comprises a mixture of at least one first gas configured for the generation of broadband radiation and at least one second gas; and
    a pump radiation source configured to generate the pump radiation,
    wherein an acoustic damping frequency of the gas mixture is substantially matched to a repetition rate of the pump radiation generated by the pump radiation source, the acoustic damping frequency corresponding to a frequency at a peak of an amplitude damping versus radiation frequency curve for the gas mixture.

2. The source device according to claim 1, wherein the gas composition of the gas mixture is configured to match the acoustic damping frequency of the gas mixture to the repetition rate of the pump radiation.

3. The source device according to claim 1, configured to tune the repetition rate of the pump radiation to match the acoustic damping frequency of the gas mixture.

4. The source device according to claim 1, wherein the pump radiation source is configured such that the repetition rate of the pump radiation is unmatched with any acoustic resonance frequencies of an inner cladding structure of the HC-PCF.

5. The source device according to claim 1, wherein an inner cladding structure of the HC-PCF comprises one or more silica tubes.

6. The source device according to claim 1, wherein the gas mixture is configured to define a spectral range of the generated broadband radiation.

7. The source device according to claim 1, wherein the broadband output comprises a wavelength range of 200 nm to 3000 nm, or a sub-range within this range.

8. A metrology device comprising the source device according to claim 1.

9. The metrology device according to claim 8, comprising a scatterometer metrology apparatus, a level sensor or an alignment sensor.

10. A method for configuring a source arrangement configured to generate a broadband radiation output and comprising a pump radiation source configured to output pump radiation, a hollow-core photonic crystal fiber (HC-PCF), and a gas medium filling the HC-PCF, the method comprising substantially matching an acoustic damping frequency of the gas medium to a repetition rate of the pump radiation generated by the pump radiation source, the acoustic damping frequency corresponding to a frequency at a peak of an amplitude damping versus radiation frequency curve for the gas mixture.

11. The method according to claim 10, further comprising configuring a gas composition of the gas medium to match the acoustic damping frequency of the gas medium to the repetition rate of the pump radiation.

12. The method according to claim 10, further comprising tuning the repetition rate of the pump radiation to match the acoustic damping frequency of the gas medium.

13. The method according to claim 10, further comprising selecting the repetition rate of the pump radiation such that it is unmatched to any acoustic resonance frequencies of an inner cladding structure of the HC-PCF.

14. The method according to claim 10, wherein the gas medium comprises a gas mixture of at least one first gas and at least one second gas, wherein the at least one first gas is configured for the generation of broadband radiation and the at least one second gas is configured to improve thermal conductivity of the gas mixture and/or provide acoustic damping of shock waves initiated during the generation of broadband radiation.

15. The method according to claim 14, wherein the at least one second gas comprises an atomic gas.

16. The method according to claim 15, wherein the at least one second gas comprises helium.

17. The method according to claim 15, wherein the at least one first gas comprises an atomic gas having a greater atomic weight than the at least one second gas.

18. The method according to claim 17, wherein the at least one first atomic gas is selected from: krypton, xenon, argon, neon.

19. A method for configuring a source arrangement configured to generate a broadband radiation output and comprising a pump radiation source configured to output pump radiation, a hollow-core photonic crystal fiber (HC-PCF), and a gas medium filling the HC-PCF, the method comprising selecting the repetition rate of the pump radiation such that it is unmatched to any acoustic resonance frequencies of an inner cladding structure of the HC-PCF.

20. The method according to claim 19, wherein the gas medium comprises a gas mixture of at least one first gas and at least one second gas, wherein the at least one first gas is configured for the generation of broadband radiation and the at least one second gas is configured to improve thermal conductivity of the gas mixture and/or provide acoustic damping of shock waves initiated during the generation of broadband radiation.

* * * * *

UNITED STATES PATENT AND TRADEMARK OFFICE
CERTIFICATE OF CORRECTION

| | | |
|---|---|---|
| PATENT NO. | : 12,399,313 B2 | Page 1 of 1 |
| APPLICATION NO. | : 18/213085 | |
| DATED | : August 26, 2025 | |
| INVENTOR(S) | : Amir Abdolvand et al. | |

It is certified that error appears in the above-identified patent and that said Letters Patent is hereby corrected as shown below:

On the Title Page

Please correct Item (73) "ASML NETHERLANDS, Veldhoven (NL)" to "ASML NETHERLANDS B.V., Veldhoven (NL)"

Signed and Sealed this
Thirtieth Day of September, 2025

John A. Squires
*Director of the United States Patent and Trademark Office*